United States Patent Office 3,247,196
Patented Apr. 19, 1966

3,247,196
N<sup>α</sup>-DERIVATIVES OF 7-(N-AMINO-ADIPOYL-
AMINO)-CEPHALOSPORANIC ACID
Ernst Vischer, Basel, Hans Bickel and Bruno Fechtig,
Binningen, and Rolf Bosshardt, Basel, Switzerland,
assignors to Ciba Corporation, New York, N.Y., a cor-
poration of Delaware
No Drawing. Filed June 18, 1963, Ser. No. 288,617
Claims priority, application Switzerland, June 21, 1962,
7,461/62; Oct. 12, 1962, 12,054/62
10 Claims. (Cl. 260—243)

The present invention relates to the manufacture of new therapeutically active derivatives of cephalosporin of the formula (I)

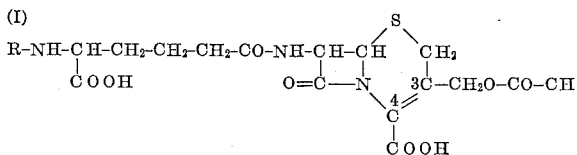

in which R represents an aminoaryl radical one amino group of which may be linked with the carboxyl group of the side chain to form a lactam ring, and of compounds in which the substituent in position 3 is cyclised with the carboxyl group in position 4 to form the lactone ring, and of salts of the said compounds.

The aryl radical is mono- or polynuclear, for example a naphthyl, more especially a phenyl group. The aryl radical is substituted by one or several amino groups, preferably by 2 or 3 amino groups. The ring may contain further substituents, for example nitro groups, halogen atoms or lower alkyl, alkoxy or carbalkoxy groups.

The salts of the new compounds are either acid addition salts or metal salts or salts with tertiary organic nitrogen bases, for instance triethylamine or N-ethyl-piperidine. Acid addition salts are, for example, those with inorganic acids, such as hydrohalic acids, for example hydrochloric or hydrobromic acid, nitric, thiocyanic, sulfuric or phosphoric acid; or with organic acids such as acetic, propionic, glycollic, lactic, pyruvic, oxalic, malonic, succinic, maleic, fumaric, tartaric, citric, benzoic, cinnamic, salicyclic, 2-phenoxy-benzoic, 2-acetoxy-benzoic, mandelic, methanesulphonic, ethanesulphonic, hydroxy-ethanesulphonic, benzenesulphonic or toluenesulphonic acid. Metal salts are primarily those of therapeutically useful alkali or alkaline earth metals, such as sodium, potassium or calcium.

The new compounds of the Formula I, their lactones and salts possess an antibacterial activity towards Gram-positive bacteria, for example Bacillus subtilis, Bacterium megatherium and Staphylococcus aureus, and more especially towards penicillin-resistant strains. They may therefore be used as medicaments in human and veterinary medicine, also as additives to animal fodder or for the preservation of food. Of special value are N-(2,4-diaminophenyl)-cephalosporin C and the lactam formed from it, 7 - [γ-(3'-oxo-6'-amino-1',2',3',4',-tetrahydro-quinoxaline - 2' - yl) - butyryl] - amino-cephalosporanic acid, and N-(2,4,6-triaminophenyl)-cephalosporin C and its lactam, 7-[γ-(3'-oxo-6',8'-diamino-1',2',3',4'-tetrahydro - quinoxaline - 2' - yl) - butyryl] - amino - cephalosporanic acid, and their lactones and salts.

The new compounds are manufactured by known methods; inter alia, they are obtained when a nitroaryl derivative of cephalosporin C of the formula (II)

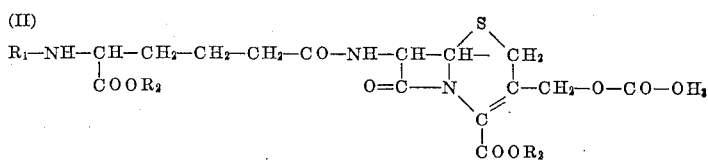

in which $R_1$ stands for a nitroaryl radical and $R_2$ for hydrogen or benzyl, or a corresponding lactone is treated with a reducing agent and, if desired, a resulting free compound is converted into a lactone and/or salt thereof.

Reducing agents are, for example, nascent or catalytically activated hydrogen, preferably hydrogen activated with palladium carbon.

The starting materials are known or can be made by known methods. Thus, the nitroaryl derivatives of cephalosporin C can be prepared, for instance, by reacting cephalosporin C with a nitroaryl compound containing a mobile substituent, for example a halogen atom or a toluenesulfonic acid ester group, more especially with dinitrofluorobenzene or trinitrochlorobenzene.

The new compounds are suitable for use as medicaments, for example in the form of pharmaceutical preparations which contain them or their salts in conjunction or admixture with an organic or inorganic solid or liquid pharmaceutical excipient suitable for enteral, local or parenteral administration. Suitable excipients are substances that do no react with the new compounds, for example water, gelatine, lactose, starches, stearyl alcohol, magnesium stearate, talcum, vegetable oils, benzyl alcohols, gums, propyleneglycol, polyalkyleneglycols, white petroleum jelly, cholesterol or other known medicinal excipients. The pharmaceutical preparations may be, for example, tablets, dragees, ointments, creams or capsules, or in liquid form solutions, suspensions or emulsions. They may be sterilised and/or may contain assistants such as preservatives, stabilisers, wetting agents or emulsifiers, solution promoters, salts for regulating the osmotic pressure, or buffers. They may also contain other therapeutically valuable substances. The preparations are formulated by the usual methods.

The following examples illustrate the invention without restricting its scope thereto.

*Example 1*

A solution of 100 mg. (=0.172 millimol) of N-(2,4-dinitrophenyl)-cephalosporin C in 20 cc. of glacial acetic acid is hydrogenated in the presence of 200 mg. of palladium carbon (10% Pd) at room temperature and under atmospheric pressure.

After 25.7 cc. of hydrogen (at 25° C. under 740 mm. Hg. pressure) have been absorbed within 2 hours (5.9 mols of hydrogen per mol of substance) the catalyst is filtered off the reaction solution, washed with 100 cc. of glacial acetic acid and the filtrate is evaporated in a high vacuum. The product, obtained as a solid substance (66 mg.; yield 73.5% of the theoretical), is soluble in glacial acetic acid, dimethylformamide, N-hydrochloric acid and N-sodium bicarbonate solution, less readily in methanol and water, and insoluble in petroleum ether, benzene, ethyl acetate, acetone and ethanol. The compound is 7-[γ-(3'-oxo-6'-amino-1',2',3',4'-tetrahydro-quinoaxiline-2'-yl)-butyryl]-amino-cephalosporanic acid of the formula

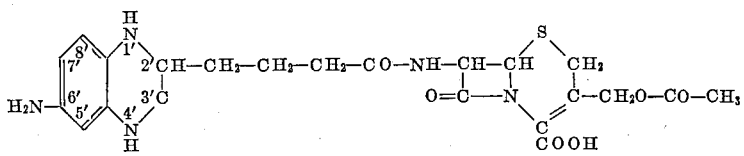

The product is identified by paper-chromatography and thin-layer chromatography in a system, saturated with water, of 100 parts by volume of n-butanol and 10 parts by volume glacial acetic acid. The paper-chromatogram is recorded on whatman paper No. 1 and the thin-layer chromatogram on silica gel G according to Stahl.

| Cephalosporin C derivative | Paper-chromatogram | Thin-layer chromatogram | Identification |
| --- | --- | --- | --- |
| N-(2,4-dinitrophenyl)-cephalosporin C. | Rƒ 0.73 | Rƒ 0.20 | (a) Color of the product. (b) Bioautogram with *Bac. subtilis.* |
| 7-[γ-(3'-oxo-6'-amino-1',2',3',4'-tetrahydro-quinoxaline-2'-yl)-butyryl]-amino-cephalosporanic acid. | Rƒ 0.50 | Rƒ 0.12 and Rƒ 0.22. | (a) Blue-green fluorescence on activation with light of 357 mµ. (b) para-dimethylaminobenzaldehyde. (c) Bioautogram with *Bac. subtilis.* |

The identification sub (b) with para-dimethylamino benzaldehyde is carried out by spraying the plate with a 1% solution in glacial acetic acid, whereupon yellow to red stains on a white ground appear spontaneously.

Ultraviolet absorption spectrum of 7-[γ-(3'-oxo-6'-amino-1',2',3',4'-tetrahydro-quinoxaline-2'-yl) - butyryl] - amino-cephalosporanic acid in glacial acetic acid:

$\lambda_{max.}$ 368 m$\mu$ ($E_{1\ cm.}^{1\%}$=173) and $\lambda_{max.}$ 253 m$\mu$ ($E_{1\ cm.}^{1\%}$=223

In the dilution test (in glucose broth, 24 hours, 37° C.) the following still inhibiting concentrations are found:

γ/ml.
For *Staphylococcus aureus* Z 2070 _____ 2
For *Staphylococcus aureus* 2999 _____ 4–12 of the new compound. The comparable values for cephalosporin C are as follows:

γ/ml.
For *Staphylococcus aureus* 2070 _____ 60–100
For *Staphylococcus aureus* 2999 _____ 100–125

The new compound is also effective in vivo. Of 10 mice infected with *Staphylococcus aureus* 10 (sensitive to penicillin) eight survive the 10th test day if they are given within 30 hours after the infection subcutaneously 5 times 10 mg./kg. of the compound. When doses of 5 mg./kg. each are administered in the same manner, 3 survivals are recorded. When 10 mice are infected with penicillin-resistant strain 2999, all ten survive the 10th test day if they are given 5 times 50 mg./kg. of the new compound, while 8 survive with doses of 25 mg./kg. each. Under identical conditions the following values are found in the case of cephalosporin C for *Staphylococcus aureus* 10:

5 doses of:                               Survival
    100 mg./kg. _____ 10
    50 mg./kg. _____ 7
    25 mg./kg. _____ 3
    5 mg./kg. _____ 1 and for *Staphylococcus aureus* 2999: 100 mg./kg., 3.
Untreated mice died on the fourth day at the latest.

*Example 2*

A solution of 100 mg. (0.1314 millimol) of 2,4-dinitrophenyl-cephalosporin C dibenzyl ester in 20 cc. of glacial acetic acid is hydrogenated with addition of 200 mg. of palladium carbon (10% Pd) at 25° C. under 738 mg. Hg pressure for 1½ hours, during which time 7.3 mols of hydrogen per mol of substance are absorbed. The catalyst is filtered off, washed with glacial acetic acid and the filtrate is evaporated to dryness in a high vacuum, to yield 57 mg. of amorphous, faintly yellowish material.

Ultraviolet absorption spectrum in glacial acetic acid:

| $\lambda_{max.}$, m$\mu$ | $E_{1\ cm.}^{1\%}$ |
| --- | --- |
| 368 | 224 |
| 252 | 242 |

The reaction product is chromatographically identical with the product described in Example 1.

The crude hydrogenation product is purified by chromatography on a column of collulose with the use of aqueous butanol as eluant. The cellulose is applied to the column by sedimentation and, before adding the substance, washed and equilibrated for 6 days with butanol+water (95:5) at a percolation rate of 3.8 to 4.4 ml. per cm.² per hour.

7.0 grams of the hydrogenation product are dissolved in a small amount of glacial acetic acid, lyophilised with addition of 10 grams of Celite 545 and pressed dry on to a column of 120 cm. layer-height and 34 cm.² cross-section. The distribution with the solvent system used for the equilibration is begun at room temperature at a percolation rate of 130 ml. per hour.

The eluate is collected in fractions of 35 ml. each on an automatic fraction collector. After having been eluted for 50 hours fraction No. 189 is switched over to gradient elution, during which the butanol entering the column, containing 5% of water, is continuously changed in a 500-ml.-mixing chamber by an equal influx of butanol saturated with water, whereby its eluting power is continuously increased. The chromatogram fractions are diluted with methanol 1:10 and tested for their biological activity by the diffusion method towards *Bacillus subtilis*. Alternatively, the fractions may be tested colorimetrically: For this purpose 0.2 cc. of the test solution and 0.2 cc. of 1% para-dimethylamino benzaldehyde solution in glacial acetic acid are mixed, the whole is left to itself for 15 minutes at room temperature and diluted with glacial acetic acid to 3 and 6 cc. respectively. The red-yellow color of the Schiff's base formed is measured spectrophotometrically at 456 m$\mu$.

The result of the color test corresponds with that of the biological test.

Among the fractions combined into groups according to the tests referred to the group with the fractions 349–370 displays the highest specific antibiotic activity.

This material is antibiotically very active towards various test organisms. Thus, in in vitro tests (glucose broth) it proves 50 times more active than cephaloporin C towards Streptococcus pyogenes AB 38, and 5 times more active towards the polyresistant Staphyloccus aureus 2977 strain.

The N-(2,4-dinitrophenyl)-cephalosporin C dibenzyl ester which is obtained in handsome crystals, used as starting material, can be prepared in the following manner:

A solution of 11.63 grams of N-2,4-dinitrophenyl-cephalosporin C in 125 cc. of dioxine is treated at 22° C. with stirring for 25 minutes with 250 cc. of a 2% solution of phenyldiazomethane in ether. On completion of the addition the batch is kept for 20 minutes and then considerably concentrated under vacuum. The residue is taken up in chloroform and then washed three times each with 2N-hydrochloric acid, N-sodium bicarbonate solution and water. The organic phase is dried and evaporated, to yield 15.54 grams of crude product. By stirring with ether the ether-soluble constituents (2.42 grams) are removed. The ether-insoluble consituents (12.84 grams) yield from acetone+ether 9.98 grams of crystalline N-2,4-dinitrophenyl-cephalosporin C dibenzyl ester which on recrystallisation melts at 109–111°. Optical rotation $[\alpha]_D^{25°} = +31.5° \pm 1°$ (c.=1 in chloroform).

Example 3

A solution of 100 mg. (0.16 millimol) of N-(2,4,6-trinitrophenyl)-cephalosporin C in 20 cc. of glacial acetic acid is hydrogenated in the presence of 200 mg. of 10% palladium carbon. When 26.4 cc. (at 30° C. under 745 mm. Hg pressure) hydrogen have been absorbed the hydrogenation is discontiued, the catalyst filtered off, rinsed with 100 cc. of glacial acetic acid and the solution is lyophilised. Yield: 46 mg. The substance is readily soluble in N-sodium bicarbonate solution, N-hydrochloric acid, dimethylformamide and glacial acetic acid, less readily soluble in methanol and ethanol, and insoluble in acetone and in non-polar solvents. The compound is 7-[γ-(3'-oxo-6',8'-diamino - 1',2',3',4' - tetrahydro - quinoxaline-2'-yl)-butyryl]-amino-cephalosporanic acid.

The substance is identified by paper-chromatography in a system, saturated with water, of 100 parts by volume of n-butanol and 10 parts by volume of glacial acetic acid (Rf 0.15; bioautographic identification with Bacillus subtilis). Ultraviolet absorption in glacial acetic acid+water (1:1):

| $\lambda_{max.}$, m$\mu$ | $E_{1\ cm.}^{1\%}$ |
|---|---|
| 246 | 304 |
| 273 | 268 |
| 340 | 164 |

The antibiotic activity in glucose broth towards three different strains of Staphylococcus is shown in the following table:

| Strain Staph. aureus No. | Inhibiting concentration in μg. per cc. | |
|---|---|---|
| | Cephalosporin C | 7-[γ-(3'-oxo-6',8'-diamino-1', 2', 3', 4'-tetrahydro-quinoxaline-2'-yl)-butyryl]-amino-cephalosporanic acid |
| 2070 | 100 | 8 |
| 2999 (penicillin-resist.) | 100 | 16 |
| 2977 (polyresistant) | 100 | 31 |

The N-(2,4,6-trinitrophenyl)-cephalosporin C used as starting material may be prepared thus:

A solution of 4 grams of cephalosporin C in 80 ml. of N-sodium bicarbonate and 80 ml. of dioxane is cooled to 0° C., and 4.2 grams of picrylchloride in 80 ml. of dioxane are then stirred in dropwise. The mixture is stirred overnight at room temperature and the solvent is then evaporated at 25° C. in a high vacuum. The residue is dissolved in 100 ml. of water and while being cooled with ice adjusted to pH=2 with hydrochloric acid of 10% strength. The precipitate formed is filtered off with the aid of Celite 545, washed with water, eluted with acetone and the eluate is evaporated to dryness under vacuum. Yield: 4.38 grams.

1.0 gram of the crude product is distributed in a counter-current distribution apparatus in the system ethylenechloride+methanol+water (2:1:1) over 100 stages with 25 ml. phase volume each. The antibiotically active solutions of fractions 21–40 are combined and evaporated to dryness under a high vacuum. Yield: 262 mg.

The substance is readily soluble in ethanol, acetone, and N-sodium bicarbonate, soluble in ethyl acetate and insoluble in water, N-hydrochloric acid and chloroform as well as in less polar solvents, e.g. methylenechloride, benzene.

The substance is identified by paper-chromatography in the same system as used in Example 1, with the use of the bioautogram test towards Bacillus subtilis (Rf 0.68).

Ultraviolet absorption spectrum in glacial acetic acid+water (1:1):

| $\lambda_{max.}$, m$\mu$ | $E_{1\ cm.}^{1\%}$ |
|---|---|
| 256 | 290 |
| 332 | 190 |

Example 4

A solution of 300 mg. (0.5 millimol) of N-(2-nitro-4-carbomethoxy-phenyl)-cephalosporin C in 40 ml. of glacial acetic acid in mixed with 600 mg. of palladium carbon of 10% strength and hydrogenated at 30° C. under 742 mm. Hg pressure for 6 hours. 97% of the theoretical amount of hydrogen is absorbed. The catalyst is filtered off, rinsed with 200 ml. of glacial acetic acid, and the solution is lyophilised. Yield: 217 mg. of 7-[γ-(3'-oxo-6'-carbomethoxy-1',2',3',4' - tetrahydro - quinoxaline-2'-yl)-butyryl]-amino-cephalosporanic acid. The substance is soluble in N-aqueous sodium bicarbonate, glacial acetic acid, dimethylformamide, sparingly soluble in methanol and acetone, and insoluble in more lyophilic solvents. Ultraviolet absorption spectrum in glacial acetic acid:

| $\lambda_{max.}$, m$\mu$ | $E_{1\ cm.}^{1\%}$ |
|---|---|
| 257 | 346 |
| 313 | 164 |

The antibiotic activity of the starting material and of the hydrogenation product in glucose broth towards 3 different Staphylococcus strains is shown in the following table:

| Stahpylococcus aureus Strain No. | Inhibiting concentration (μg./ml.) | |
|---|---|---|
| | N-[2-nitro-4-carbomethoxy-phenyl]-cephalosporin C | 7-[γ-(3'-oxo-6'-carbomethoxy-1',2',3'.4'-tetrahydro-quinoxaline-2'-yl)-butyryl]-amino-cephalosporanic acid |
| 2070 | 13 | 1.6 |
| 2999 (penicillin-resistant) | 25 | 12.5 |
| 2977 (polyresistant) | | 25.0 |

Like the starting material, the hydrogenation product can be identified bioautographically (*Bacillus subtilis*) on whatman paper No. 1 in the paper-chromatogram.

|  | Rƒ-values | |
| --- | --- | --- |
|  | n-Butanol, saturated with water | Ethyl acetate, pyridine, glacial acetic acid, water (60, 20, 6, 11) |
| N-[2-nitro-4-carbomethoxy-phenyl]-cephalosporin C | 0.00 | 0.33 |
| 7-[γ-(3'-oxo-6' carbomethoxy-1',2',3',4'-tetrahydro-quinoxaline-2'-yl)-butyryl]-aminocephalosporanic acid | 0.25 | 0.51 |

7 - [γ-(3' - oxo - 6'-carbomethoxy-1',2',3',4'-tetrahydro-quinoxaline-2'-yl)-butyryl]-amino - cephalosporanic acid displays a strong antibacterial activity also in vivo. When 10 mice infected with *Staphylococcus aureus* 10 are given subcutaneously 5 times 5 mg./kg. of the new compound within 30 hours after the infection, two mice survive the 10th day after the infection. When the mice are infected with *Staphylococcus aureus* 2999 and treated under identical conditions with 5 times 50 mg./kg. of 7-[γ-(3'-oxo-6'-carbomethoxy-1',2',3',4'-tetrahydro-quinoxaline - 2' - yl)-butyryl]-amino-cephalosporanic acid or with 5 times 25 mg./kg. respectively, 6 survivals and 1 survival respectively are/is recorded. Infected mice, not treated with the compound, died at the latest on the fourth day after infection.

N-(2-nitro-4-carbomethoxyphenyl) - cephalosporin C used as starting material can be prepared as follows:

1 g. (2.07 millimols) of the barium salt of cephalosporin C is dissolved in 30 ml. of N-sodium bicarbonate and 5 ml. of dioxane. 0.8 g. of 3-nitro-4-fluorobenzoic acid methyl ester in 5 ml. of dioxane is slowly stirred in dropwise at room temperature and the mixture is stirred for 15 hours at 35° C. The reaction mixture is washed at pH 8.5 and pH 5.0 (adjusted with 5 ml. of hydrochloric acid of 10% strength) with 3 x 100 ml. of ethyl acetate. The aqueous solution is adjusted to pH 2.5 with 1.5 ml. of hydrochloric acid of 10% and then extracted with 4 x 100 ml. of ethyl acetate, and the solution is washed with 3 x 20 ml. of saturated sodium chloride solution, dried and evaporated under vacuum. Yield: 640 mg (=54% of the theoretical).

400 mg. of the crude product are distributed in a counter-current distribution apparatus in the system ethyl acetate:molar-sodium acetate buffer pH 4.0 (1:1) over 20 stages with a phase volume of 10 ml. each. The antibiotically active solutions of the fractions 3-9 are combined, adjusted with hydrochloric acid of 10% strength to pH 2.5, extracted four times with equal amounts of ethyl acetate, washed with sodium chloride solution, dried over sodium sulphate and evaporated. Yield: 230 mg. The substance dissolves readily in methanol, acetone and N-aqueous sodium bicarbonate solution, less readily in chloroform, ethyl acetate and water, and is insoluble in methylenechloride, benzene, petroleum ether and N-hydrochloric acid. Ultraviolet absorption spectrum in glacial acetic acid:

| $\lambda_{max.}, m\mu$ | $E_{1\ cm.}^{1\%}$ |
| --- | --- |
| 260 | 450 |
| 285 | 410 |
| 398 | 115 |

What is claimed is:

1. Process for the manufacture of derivatives of cephalosporin selected from the group consisting of compounds of the formula

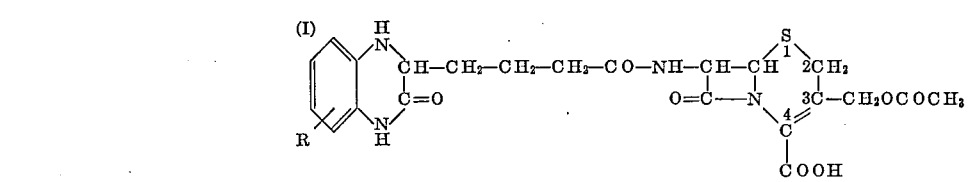

(I)

wherein R stands for one or more substituents selected from the group consisting of amino, lower alkyl, lower alkoxy, lower carbalkoxy and halogen, and the lactone of the 3-hydroxymethyl compounds, and salts of said compounds, wherein a nitroaryl derivative of cephalosporin C selected from the group consisting of a compound of the formula

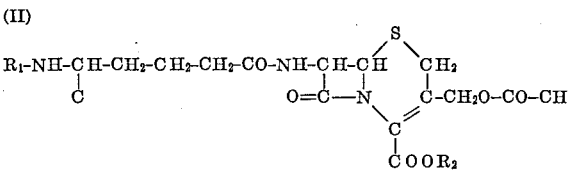

(II)

in which $R_1$ stands for a member selected from the group consisting of unsubstituted 2-nitro-phenyl and substituted 2 - nitro - phenyl, said substituents being selected from the group consisting of nitro, lower alkyl, lower alkoxy, lower carbalkoxy and halogen and $R_2$ for a member selected from the group consisting of hydrogen and benzyl, and a lactone of said compound is treated with catalytically activated hydrogen in glacial acetic acid.

2. A derivative of cephalosporin C selected from the group consisting of compounds of the formula

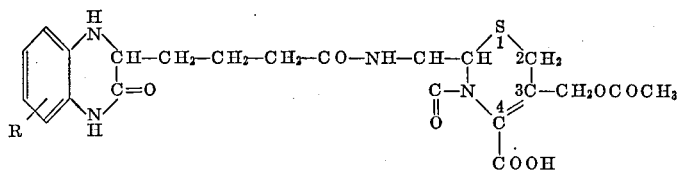

wherein R stands for one or more substituents selected from the group consisting of hydrogen, primary amino, lower alkyl, lower alkoxy, lower carbalkoxy and halogen.

3. A derivative of cephalosporin C selected from the group consisting of compounds of the formula

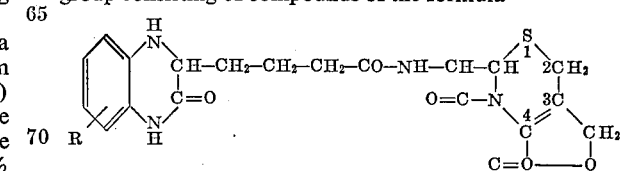

wherein R stands for one or more substituents selected from the group consisting of hydrogen, primary amino, lower alkyl, lower alkoxy, lower carbalkoxy and halogen.

4. Process according to claim 1, wherein 7-[ω-(2,4-dinitrophenylamino)-adipoylamino]-cephalosporanic acid is used as starting material.

5. Process according to claim 1, wherein 7-[ω-(2,4,6-trinitrophenylamino)-adipoylamino]-cephalosporanic acid is used as starting material.

6. Process according to claim 1, wherein 7-[ω-(2-nitro-4-carbomethoxyphenylamino)-adipoylamino]-cephalosporanic acid is used as starting material.

7. A salt of the compound claimed in claim 2, said salt being a member selected from the group consisting of (1) an acid addition salt, (2) a salt with a tertiary organic nitrogen base, (3) an alkali metal salt, and (4) an alkaline earth metal salt.

8. A member selected from the group consisting of 7 - [γ-(3'-oxo-6'-amino-1',2',3',4'-tetrahydroquinoxaline-2'-yl)-butyryl]-amino-cephalosporanic acid, the lactone of the corresponding 3-hydroxymethyl compound and salts, said salts being selected from the group consisting of (1) acid addition salts, (2) salts with tertiary organic nitrogen bases, (3) alkali metal salts, and (4) alkaline earth metal salts.

9. A member selected from the group consisting of 7 - [γ-(3'-oxo-6',8'-diamino-1',2',3',4'-tetrahydroquinoxaline-2'-yl)-butyryl]-amino-cephalosporanic acid, the lactone of the corresponding 3-hydroxymethyl compound and salts, said salts being selected from the group consisting of (1) acid addition salts, (2) salts with tertiary organic nitrogen bases, (3) alkali metal salts, and (4) alkaline earth metal salts.

10. A member selected from the group consisting of 7 - [γ-(3'-oxo-6'-carbomethoxy-1',2',3',4'-tetrahydroquinoxaline-2'-yl)-butyryl]-amino-cephalosporanic acid, the lactone of the corresponding 3-hydroxymethyl compound and salts, said salts being selected from the group consisting of (1) acid addition salts, (2) salts with tertiary organic nitrogen bases, (3) alkali metal salts, and (4) alkaline earth metal salts.

References Cited by the Examiner
UNITED STATES PATENTS 3,124,576   3/1964   Stedman _____ 260—243

OTHER REFERENCES

Wertheim: "Textbook of Organic Chemistry," pages 206–208 and 763–764 (second edition) (1945).

NICHOLAS S. RIZZO, *Primary Examiner.*